(12) United States Patent
Fankhauser et al.

(10) Patent No.: US 10,893,002 B2
(45) Date of Patent: Jan. 12, 2021

(54) UNIVERSAL RADIO FREQUENCY ROUTER WITH AN AUTOMATIC GAIN CONTROL

(71) Applicant: Evertz Microsystems Ltd., Burlington (CA)

(72) Inventors: Eric Fankhauser, Burlington (CA); Constantin Lacatus, Hamilton (CA)

(73) Assignee: Evertz Microsystems Ltd., Burlington (CA)

(*) Notice: Subject to any disclaimer, the term of this patent is extended or adjusted under 35 U.S.C. 154(b) by 7 days.

(21) Appl. No.: 16/212,773

(22) Filed: Dec. 7, 2018

(65) Prior Publication Data

US 2019/0182181 A1 Jun. 13, 2019

Related U.S. Application Data

(60) Provisional application No. 62/651,787, filed on Apr. 3, 2018, provisional application No. 62/596,291, filed on Dec. 8, 2017.

(51) Int. Cl.
*H04W 56/00* (2009.01)
*H04L 12/933* (2013.01)
*H04W 52/52* (2009.01)

(52) U.S. Cl.
CPC .......... *H04L 49/101* (2013.01); *H04W 52/52* (2013.01)

(58) Field of Classification Search
CPC .............................. H04L 49/101; H04W 52/52
USPC .......................................................... 370/400
See application file for complete search history.

(56) References Cited

U.S. PATENT DOCUMENTS

| 2,189,925 A | 2/1940 | Reinken |
| 2,408,821 A | 10/1946 | Stearns |
| 2,979,667 A | 4/1961 | Paschal |
| 3,546,591 A | 12/1970 | Overlie |
| 3,731,216 A | 5/1973 | Nakamura et al. |
| 5,283,536 A | 2/1994 | Wheatley, III et al. |

(Continued)

FOREIGN PATENT DOCUMENTS

| CA | 596077 A | 4/1960 |
| CA | 914767 A | 11/1972 |

(Continued)

*Primary Examiner* — Sai Ming Chan
(74) *Attorney, Agent, or Firm* — Bereskin & Parr LLP/S.E.N.C.R.L., s.r.l.

(57) ABSTRACT

Various embodiments are described herein for a radio frequency (RF) signal router. In one example embodiment, the RF router comprises a controller, an input stage, an intermediate stage and an output stage. The input stage includes RF input terminals, pre-processing circuit and input processors, where each RF input terminal receives an incoming RF signal, each pre-processing circuit processes the incoming RF signal based on its power level, and each input processor adjusts a power level of an input RF signal based on a first controller signal to generate a processed input RF signal. The intermediate stage comprises intermediate switch matrices coupled to a controller and input processors, and configured to route intermediate RF signals. The output stage comprises output processors coupled to the controller, where each output processor is configured to adjust a power level of an output RF signal based on a second controller signal and generate a processed output RF signal, and where the second controller signal corresponds to the first controller signal.

30 Claims, 8 Drawing Sheets

(56) References Cited

U.S. PATENT DOCUMENTS

| | | | |
|---|---|---|---|
| 5,590,408 A | 12/1996 | Weiland et al. | |
| 7,555,309 B2 | 6/2009 | Baldor et al. | |
| 7,570,933 B2 | 8/2009 | Taipale et al. | |
| 7,962,111 B2 | 6/2011 | Solum | |
| 8,036,617 B2 | 10/2011 | Olgaard | |
| 8,085,088 B2 | 12/2011 | Bax | |
| 8,818,537 B2 | 8/2014 | Kloiber et al. | |
| 9,240,958 B2 | 1/2016 | Baldor | |
| 9,432,852 B2 | 8/2016 | Zhan et al. | |
| 9,602,359 B2 | 3/2017 | Mau et al. | |
| 2002/0051482 A1 | 5/2002 | Lomp | |
| 2002/0080446 A1* | 6/2002 | Derventzis | H04Q 11/0005 398/48 |
| 2003/0211836 A1* | 11/2003 | Khorram | H03J 3/08 455/135 |
| 2004/0062510 A1* | 4/2004 | Romo | G02B 6/266 385/140 |
| 2006/0202033 A1* | 9/2006 | Campero | G06K 7/0008 235/436 |
| 2007/0248087 A1* | 10/2007 | Magarelli | H04L 49/206 370/360 |
| 2009/0021835 A1* | 1/2009 | Peters | G02B 6/12011 359/618 |
| 2013/0271236 A1* | 10/2013 | Baldor | H04L 49/15 333/101 |
| 2017/0180510 A1 | 6/2017 | Mau et al. | |

FOREIGN PATENT DOCUMENTS

| | | |
|---|---|---|
| CA | 2774718 A1 | 10/2013 |
| CA | 2543885 C | 8/2014 |
| CN | 1602057 A | 3/2005 |
| WO | 03043186 A2 | 5/2003 |

* cited by examiner

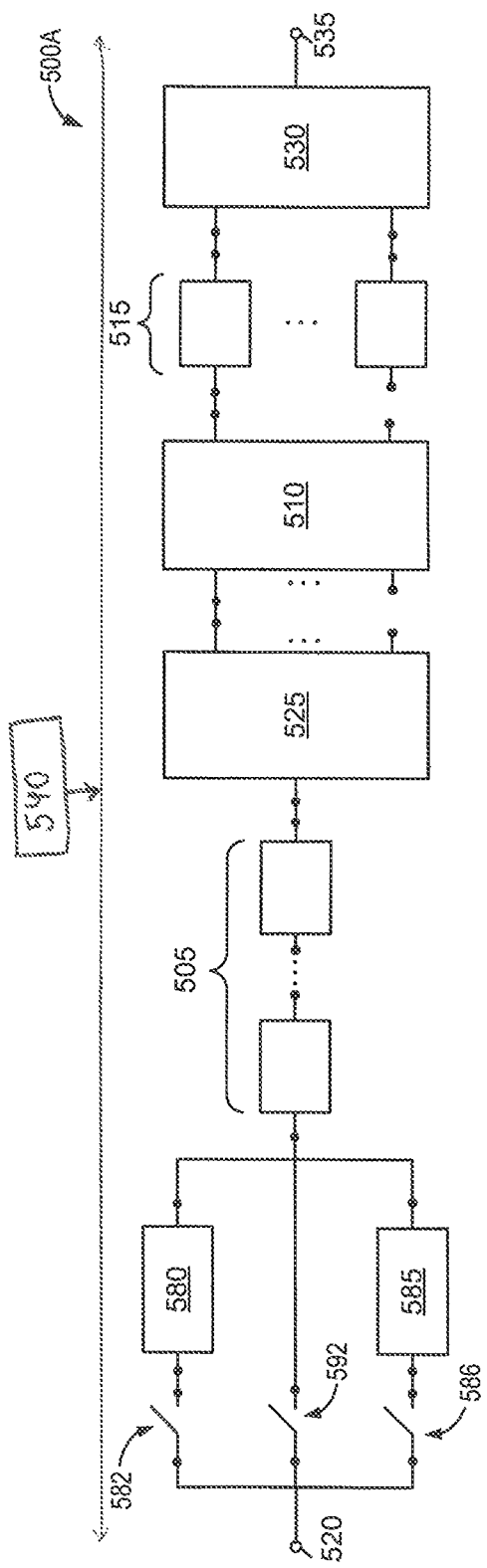
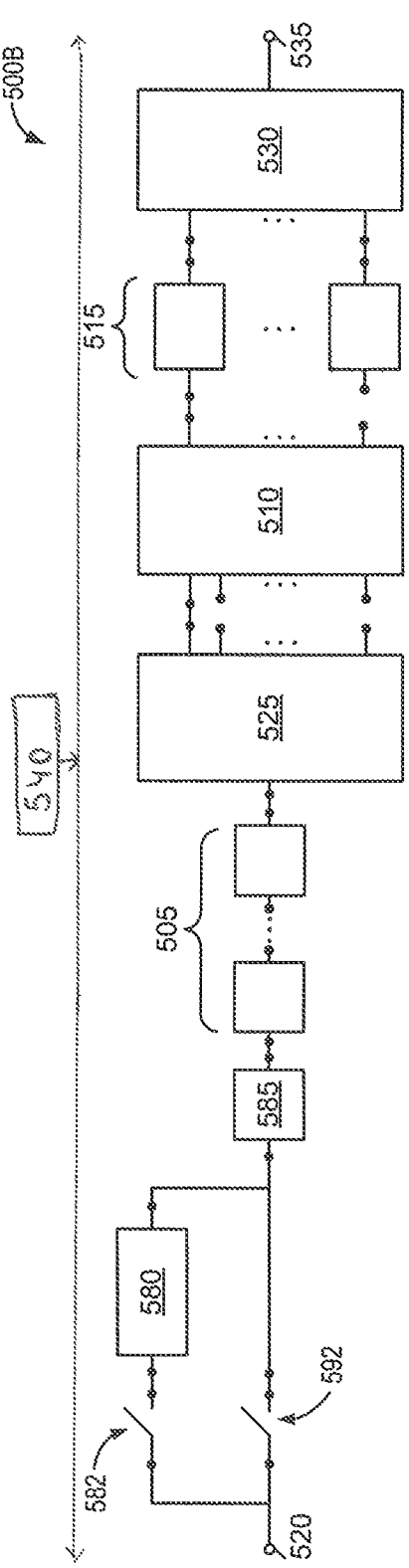
FIG. 5A
FIG. 5B

UNIVERSAL RADIO FREQUENCY ROUTER WITH AN AUTOMATIC GAIN CONTROL

CROSS-REFERENCE TO RELATED APPLICATIONS

This application claims the benefit of U.S. Provisional Application No. 62/651,787 filed Apr. 3, 2018, and U.S. Provisional Application No. 62/596,291 filed Dec. 8, 2017, the disclosures of which are incorporated herein by reference.

FIELD

The described embodiments relate to systems and methods for routing radio frequency (RF) signals, and in particular, to systems and methods for routing radio frequency signals using an automatic gain control (AGC) in a universal fan-in/fan-out router.

BACKGROUND

Conventional RF routers for routing RF signals may experience certain disadvantages, such as signal distortions or blocking, especially when the RF signals being received are high power signals. There is a need to improve such RF routing systems to reduce these disadvantages.

SUMMARY

In one aspect, in at least one embodiment described herein, there is provided a radio frequency (RF) router comprising: a controller; an input stage comprising: a plurality of RF input terminals, wherein each RF input terminal is configured to receive an incoming RF signal; and a plurality of input processors coupled to the plurality of RF input terminals and the controller, each input processor being configured to process an input RF signal to generate a processed input RF signal, and each input processor being further configured to adjust a power level of the corresponding input RF signal based on a first signal from the controller; an intermediate stage comprising a plurality of intermediate switch matrices coupled to the controller, each intermediate switch matrix being coupled to the plurality of input processors, the plurality of intermediate switch matrices being configured to route a plurality of intermediate RF signals; and an output stage comprising: a plurality of output processors coupled to the controller, each output processor being configured to process an output RF signal and generate a processed output RF signal, and each output processor being further configured to adjust a power level of the corresponding output RF signal based on a second signal from the controller, wherein the second signal corresponds to the first signal.

In some embodiments, the input stage further comprises a plurality of splitters coupled the plurality of input processors, each splitter being coupled between a corresponding input processor and at least two intermediate switch matrices, and configured to split the corresponding processed input RF signal into two or more intermediate RF signals.

In some other embodiments, the input stage further comprises a plurality of splitters, each splitter being coupled between a corresponding RF input terminal and at least two of the plurality of input processors, the splitter being configured to split the incoming RF signal received at the corresponding RF input terminal into two or more input RF signals.

In some embodiments, the output stage further comprise a plurality of combiners coupled between the plurality of output processors and a plurality of RF output terminals, each combiner being configured to combine two or more processed output RF signals to generate an outgoing RF signal.

In some other embodiments, the output stage further comprises a plurality of selectors coupled between the plurality of output processors and a plurality of RF output terminals, each selector being configured to select a processed output RF signals to generate an outgoing RF signal.

In some further embodiments, the output stage further comprises a plurality of selectors coupled between the plurality of intermediate switch matrices and the plurality of output processors, each selector being configured to select an intermediate RF signal to generate an output RF signal.

In some embodiments, the input processor is configured to adjust the power level of the corresponding input RF signal by amplifying the input RF signal to a system power level.

In some embodiments, if the input processor is configured to amplify the input RF signal to a system power level, the output processor is configured to amplify the output RF signal to an output power level, wherein the amplification of the output RF signal compensates for the amplification of the input RF signal.

In some embodiments, the power level adjustment of the output RF signal based on the second signal is the inverse of the power level adjustment of the input RF signal based on the first signal.

In some embodiments, the second signal is partially based on the first signal. In such embodiments, the second signal is configured to compensate for the input stage processing as well as further processing of the signal to increase or decrease its power level.

In another aspect, in at least one embodiments described herein, there is provided a radio frequency (RF) router comprising: a controller; an input stage comprising: a plurality of RF input terminals, wherein each RF input terminal is configured to receive an input RF signal; a plurality of input processors coupled to the controller, each input processor being coupled to a unique RF input terminal, and each input processor being configured to process the input RF signal received at the corresponding RF input terminal to generate a processed input RF signal, wherein each input processor is configured to adjust a power level of the corresponding input RF signal based on a first signal from the controller; and a plurality of splitters coupled the plurality of input processors, each splitter being coupled to a unique input processor, and configured to split the corresponding processed input RF signal into two or more intermediate RF signals; an intermediate stage comprising a plurality of intermediate switch matrices coupled to the controller, each intermediate switch matrix being coupled to the plurality of splitters, the plurality of intermediate switch matrices being configured to route a plurality of intermediate RF signals; and an output stage comprising: a plurality of output processors coupled to the controller, each output processor being configured to process an intermediate RF signal and generate a processed output RF signal wherein each output processor is configured to adjust a power level of the corresponding intermediate RF signal based on a second signal from the controller, wherein the second signal corresponds to the first signal; and a plurality of combiners coupled to the plurality of output processors and configured to combine two or more processed output RF signals to generate an output RF signal.

In some embodiments, the input processor is configured to adjust the power level of the corresponding input RF signal by amplifying the input RF signal to a system power level.

In some embodiments, if the input processor is configured to amplify the input RF signal by a gain level, the output processor is configured to adjust the power level of the corresponding intermediate RF signal by attenuating the intermediate RF signal by an attenuation level corresponding to the gain level.

In some embodiments, if the input processor is configured to amplify the input RF signal to a system power level, the output processor is configured to amplify the output RF signal to an output power level, wherein the amplification of the output RF signal compensates for the amplification of the input RF signal.

In some embodiments, the power level adjustment of the output RF signal based on the second signal is inverse of the power level adjustment of the output RF signal based on the second signal.

In another aspect, in at least one embodiment described herein, there is provided a radio frequency (RF) router comprising: a controller; an input stage comprising: a plurality of RF input terminals, wherein each RF input terminal is configured to receive an input RF signal, and wherein the input stage further comprises: a plurality of splitters, each splitter being uniquely coupled to a RF input terminal, the splitter being configured to split the input RF signal received at the corresponding RF input terminal into two or more intermediate RF signals; and a plurality of input processors coupled to the controller, each input processor being configured to receive an intermedia RF signal and process the intermediate RF signal to generate a corresponding processed RF signal, wherein each input processor is configured to adjust a power level of the corresponding input RF signal based on a first signal from the controller; an intermedia stage comprising a plurality of intermedia switch matrices coupled to the controller, each switch matrix coupled to receive a plurality of processed RF signals from the plurality of input processors, and route the processed RF signals; and an output stage comprising: a plurality of output processors coupled to the controller, each output processor being configured to receive a processed RF signal and further process the processed RF signal to generate a corresponding processed output RF signal, wherein each output processor is configured to adjust a power level of the corresponding intermediate RF signal based on a second signal from the controller, wherein the second signal corresponds to the first signal; and a plurality of combiners coupled to the plurality of output processors and configured to combine two or more processed output RF signals to generate an output RF signal.

In some embodiments, the input processor is configured to adjust the power level of the corresponding input RF signal by amplifying the input RF signal to a system power level.

In some embodiments, if the input processor is configured to amplify the input RF signal to a system power level, the output processor is configured to amplify the output RF signal to an output power level, wherein the amplification of the output RF signal compensates for the amplification of the input RF signal.

In some embodiments, the power level adjustment of the output RF signal based on the second signal is inverse of the power level adjustment of the output RF signal based on the second signal.

In some embodiments, the second signal is partially based on the first signal. In such embodiments, the second signal is configured to compensate for the input stage processing as well as further processing of the signal to increase or decrease its power level.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from the detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

FIG. 5A is an example of a block diagram of a RF routing system with a pre-processing circuit;

FIG. 5B is another example of a block diagram of a RF routing system with a pre-processing circuit.

Figure 1:
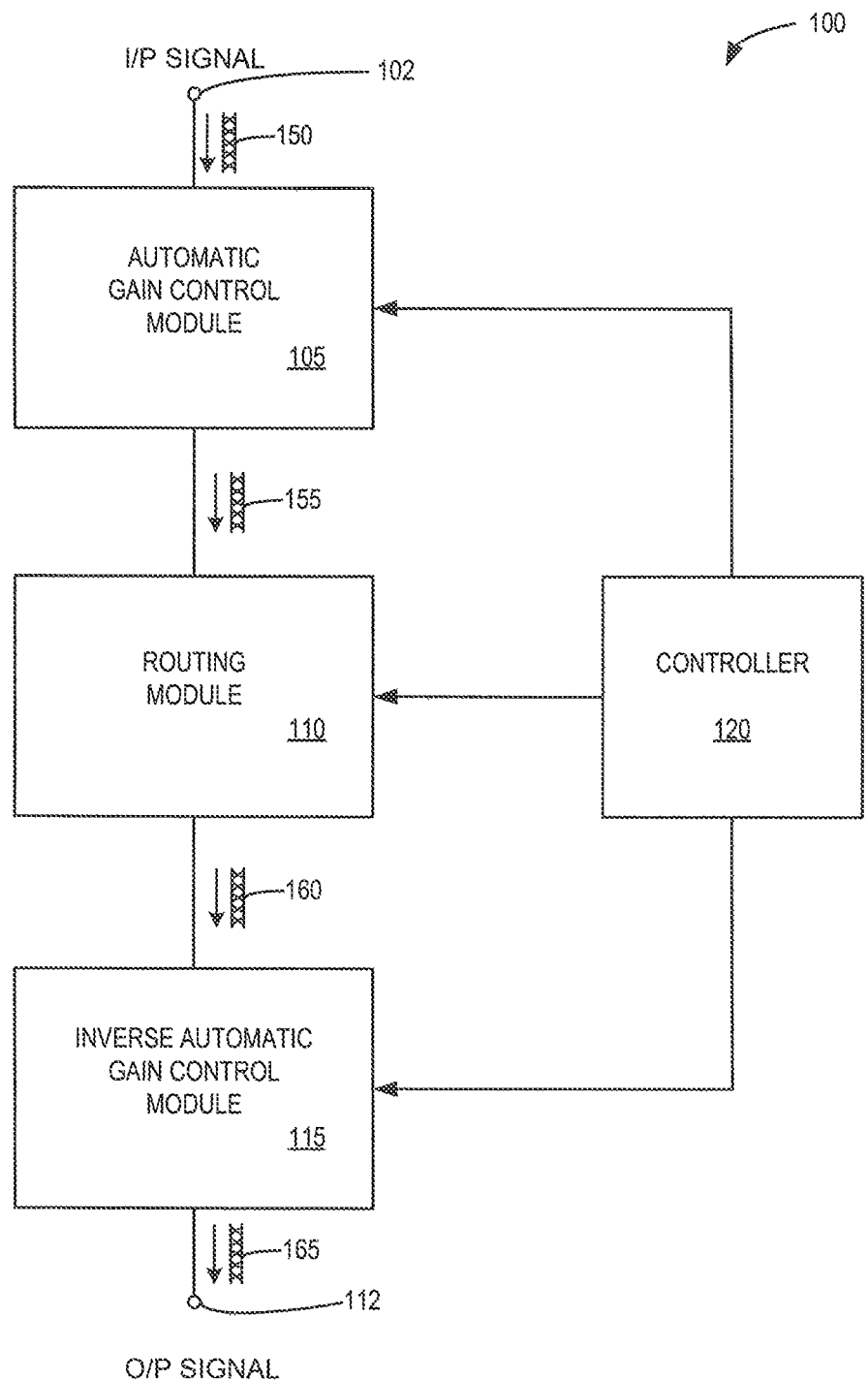
FIG. 1 is an example of a block diagram of a RF routing system.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, as used herein, the terms the terms "coupled" or "coupling" can indicates that two elements or devices can be directly coupled to one another or indirectly coupled to one another through one or more intermediate elements or devices via an electrical element, electrical signal or a mechanical element such as but not limited to, a wire or cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments disclosed herein generally relate to systems and methods for routing radio frequency (RF) signals. In particular, the various embodiments described herein relate to systems and methods for routing radio frequency signals using an automatic gain control (AGC).

Reference is first made to FIG. 1, which illustrates a RF signal routing system 100 according to an example embodiment. System 100 includes an input terminal 102, an input stage processor 105, a routing module 110, an output stage processor 115, a controller 120, and an output terminal 112. As illustrated, the input terminal 102 is coupled to the input stage processor 105, which is coupled to the routing module 110. The routing module 110 is coupled to the output stage processor 115, which is coupled to the output terminal 112. The controller is coupled to the input stage processor 105, the routing module 110 and the output stage processor 115. In one example, the RF signal routing system 100 is configured to manage and route signals within a satellite communication facility. Such signals may include L-band frequencies, intermediate frequencies (IF), and other RF signals that are used to transmit data.

In the illustrated embodiment, the RF signal routing system 100 is configured to receive, process and route multiple RF signals. The incoming RF signals that are received by the RF signal routing system 100 may span over a wide power range. In some cases, such incoming RF signals routed through conventional RF routers undergo signal distortions and high noise levels, such as signal clipping, or signal levels close to the noise floor, etc. The various embodiments described herein relate to techniques that improve the input range and RF performances of the incoming signals by adjusting the power levels of the incoming RF signals, and compensating for the adjustments of the incoming RF signals at the output stage, as described in detail below.

In the illustrated embodiment, the input stage processor 105 is configured to receive one or more input RF signals. For ease of explanation, only one input RF signal 150 is illustrated and discussed below. However, the same teachings apply to more than one input RF signals.

In the illustrated embodiment, the input stage processor 105 is configured to receive and process the input RF signal 150 to generate a processed RF signal 155. In the illustrated embodiment, the input stage processor 105 includes an automatic gain control (or AGC) module, and processes the input RF signal 150 by adjusting the power level of the input RF signal 150. The input stage processor 105 is configured to provide a constant power level for the input RF signals being received by the system 100.

In some embodiments, the input stage processor 105 is configured to adjust the power level of the input RF signal 150 to a pre-determined power level. In some other cases, the input stage processor 105 is configured to adjust the power level of the input RF signal 150 to a selected power level provided by a controller 120.

The processed input RF signal 155, generated by the input stage processor 105, is received by the routing module 110. The routing module 110 is configured to route one or more processed input RF signals, such as processed input RF signal 155, between one or more input switch terminals and one or more output switch terminals, and provide routed RF signals, such as routed RF signal 160, at the output switch terminals.

The output stage processor 115 is configured to receive the routed RF signal 160 from the routing module 110 and process the received signal to generate an output RF signal 165. The output stage processor 115 is configured to process the routed RF signal 160 to adjust its power level based on a target power level provided by the controller 120.

In some embodiments, the output stage processor 115 includes an inverse AGC module configured to compensate for the power level adjustment carried out by the input stage processor 105. For example, the power level adjustment carried out by the output stage processor 115 is the inverse of the power level adjustment carried out by the corresponding input stage processor 105. In such embodiments, the target power level signal provided by the controller 120 takes into account the processing carried out by the input stage processor 105.

In some other embodiments, the target power level signal provided by the controller 120 takes into account both the processing carried out by the input stage processor 105 as well as any additional increase or decrease in the power level of the routed RF signal 160, as may be instructed by an operator or determined by the controller 120 based on the application of the RF signal routing system 100, or based on other factors. In such embodiments, the routed RF signal 160 is processed by the output stage processor 105 based on the target power level provided by the controller 120 to generate a processed RF signal 160.

System 100 may provide the advantage of increasing performance for complex multistage RF systems. In system 100, the input range and RF performances may be improved if the power level of the signals traveling through the system is kept at a pre-determined level or range to avoid clipping or going too close to the noise floor.

Reference is next made to FIGS. 2A-2D, each of which illustrate a unique configuration of an RF signal routing system, such as the RF signal routing system 100. The various embodiments illustrated in FIGS. 2A-2D include the same components, such as splitters 225, input stage processors 205, routing modules 210, selectors 230 and output stage processors 215, but are unique based on the unique configuration and coupling of the various components, as discussed in detail below.

Figure 2A:
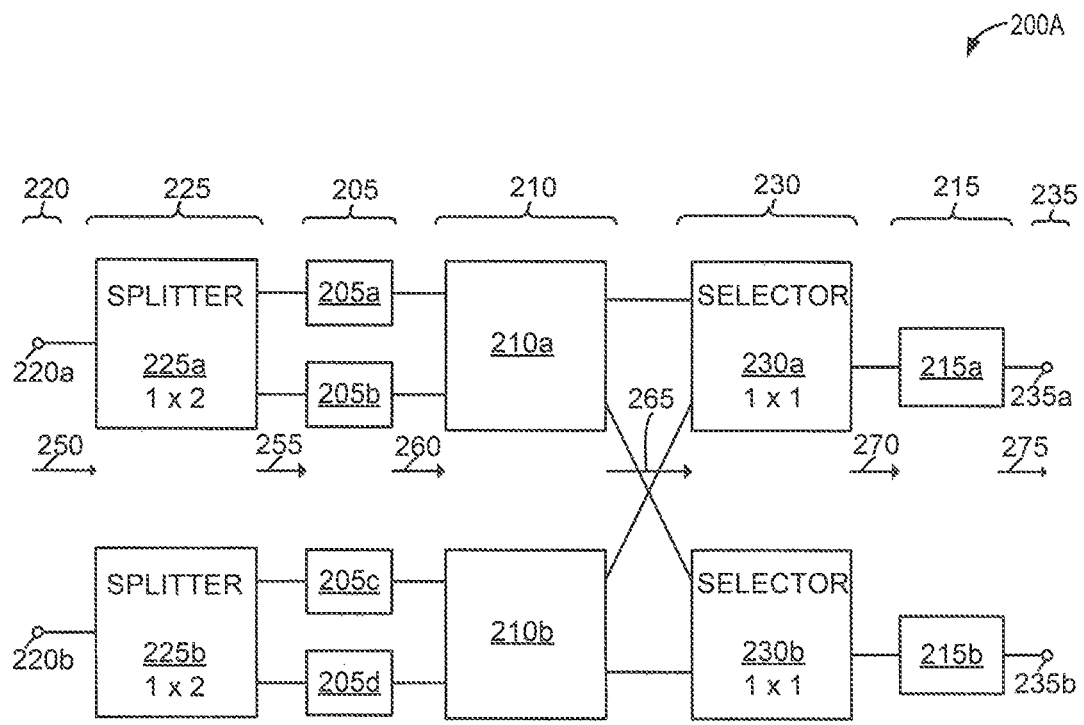
FIG. 2A is an example of a block diagram of a RF routing system using splitters.

FIG. 2A illustrates an RF signal routing system 200A according to one example. As illustrated in FIG. 2A, RF signal routing system 200A comprises input terminals 220, splitters 225, input stage processors 205, routing switches 210, selectors 230, output stage processors 215 and output terminals 235 coupled in that order. In particular, in the example embodiment of FIG. 2A, a first input terminal 220a is coupled to a first splitter 225a, and a second input terminal 220b is coupled to a second splitter 225b. The first splitter 225a is coupled to a first input stage processor 205a and a second input stage processor 205b. The second splitter 225b is coupled to third input stage processor 205c and a fourth input stage processor 205d. The first input stage processor 205a and the second input stage processor 205b are coupled to a first selector 230a via a first routing switch 210a. The third input stage processor 205c and the fourth input stage processor 205d are coupled to a second selector 230b via a second routing switch 210b. The first selector 230 is coupled to a first output stage processor 215a, and the second selector 230 is coupled to a second output stage processor 215b. The first output stage processor 215a is coupled to a first output terminal 235a, and the second output stage processor 215b is coupled to a second output terminal 235b.

Figure 2B:
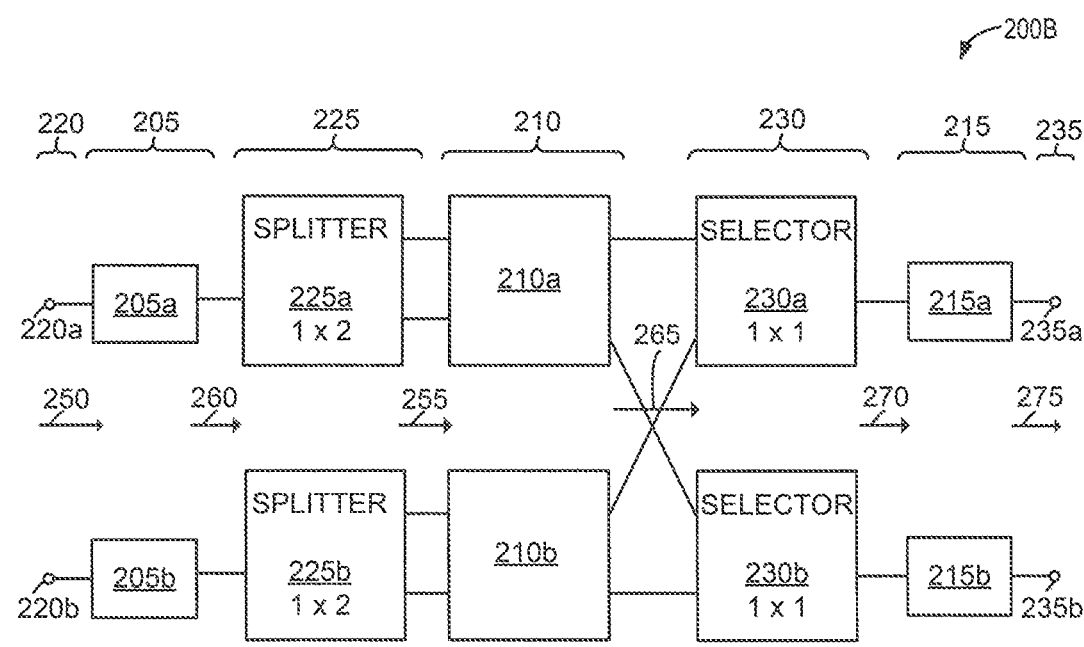
FIG. 2B is another example of a block diagram of a RF routing system using splitters.

Reference is next made to FIG. 2B, which illustrates an RF signal routing system 200B according to another example. As illustrated in FIG. 2B, RF signal routing system 200B comprises input terminals 220, input stage processors 205, splitters 225, routing switches 210, selectors 230, output stage processors 215 and output terminals 235 coupled in that order. In particular, in the example embodiment of FIG. 2B, a first input terminal 220a is coupled to a first input stage processor 205a, and a second input terminal 220b is coupled to a second input stage processor 205b. The first input stage processor 205a is coupled to a first splitter 225a, and the second input stage processor 205b is coupled to a second splitter 225b. The first splitter 225a is coupled to a first selector 230a via a first routing switch 210a, and the second splitter 225b is coupled to a second selector 230b via a second routing switch 210b. The first selector 230a is coupled to a first output stage processor 215a, and the second selector 230b is coupled to a second output stage processor 215b. The first output stage processor 215a is coupled to a first output terminal 235a, and the second output stage processor 215b is coupled to a second output terminal 235b.

Figure 2C:
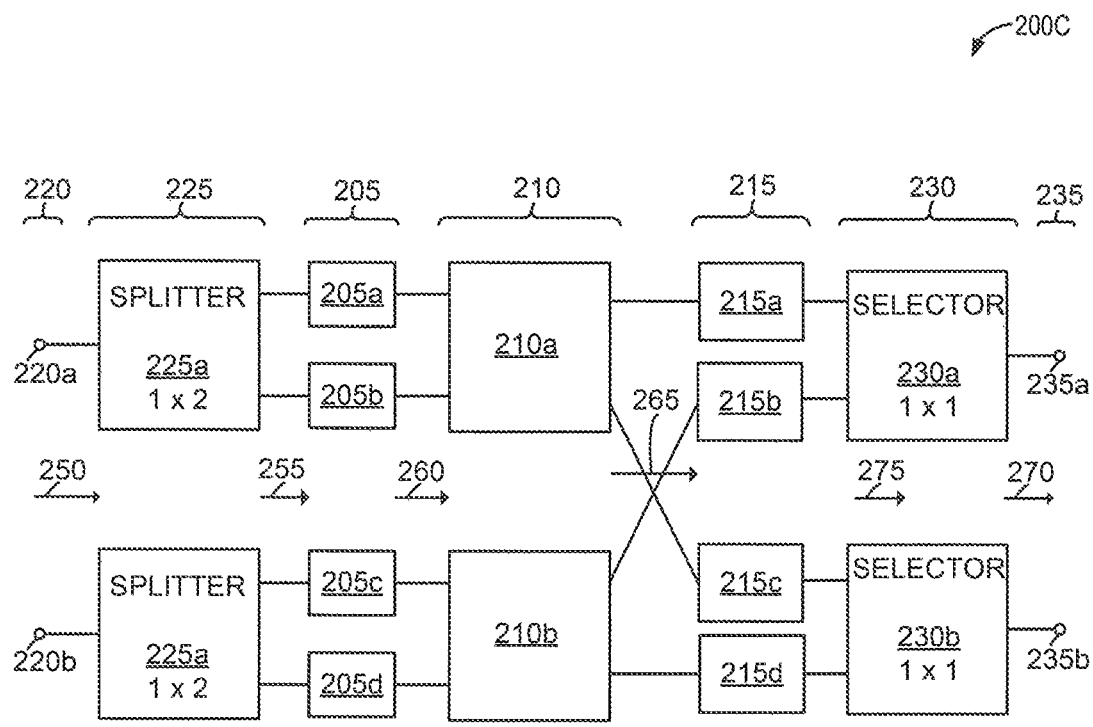
FIG. 2C is a further example of a block diagram of a RF routing system using splitters.

Reference is next made to FIG. 2C, which illustrates an RF signal routing system 200C according to a further example. As illustrated in FIG. 2C, RF signal routing system 200C comprises input terminals 220, splitters 225, input stage processors 205, routing switches 210, output stage processors 215, selectors 230 and output terminals 235 coupled in that order. In particular, in the example embodiment of FIG. 2C, a first input terminal 220a is coupled to a first splitter 225a, and a second input terminal 220b is coupled to a second splitter 225b. The first splitter 225a is coupled to a first input stage processor 205a and a second input stage processor 205b. The second splitter 225b is coupled to a third input stage processor 205c and a fourth input stage processor 205d. The first and second input stage processors 205a, 205b are coupled to the first and second output stage processors 215a, 215b, respectively, via a first routing switch 210a. The third and fourth input stage processors 205c, 205d are coupled to third and fourth output stage processors 215c, 215d, respectively, via a second routing switch 210b. The first and second output stage processors 215a, 215b are coupled to a first selector 230a, which is coupled to a first output terminal 235a. The third and fourth output stage processors 215c, 215d are coupled to a second selector 230b, which is coupled to a second output terminal 235b.

Figure 2D:
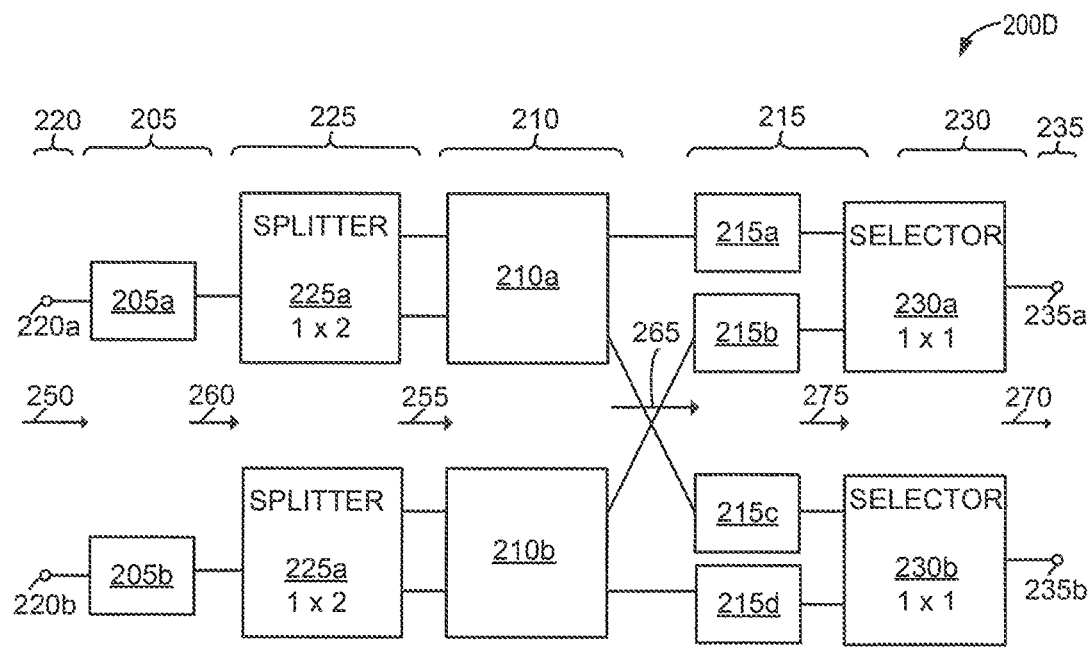
FIG. 2D is another example of a block diagram of a RF routing system using splitters.

Reference is next made to FIG. 2D, which illustrates an RF signal routing system 200D according to another example. As illustrated in FIG. 2D, RF signal routing system 200D comprises input terminals 220, input stage processors 205, splitters 225, routing switches 210, output stage processors 215, selectors 230 and output terminals 235 coupled in that order. In particular, in the example embodiment of FIG. 2D, a first input terminal 220a is coupled to a first input stage processor 205a, and a second input terminal 220b is coupled to a second input stage processor 205b. The first input stage processor 205a is coupled to a first splitter 225a, and the second input stage processor 205b is coupled to a second splitter 225b. The first splitter 225a is coupled to a first output stage processor 215a and a second output stage processor 215b via a first routing switch 210a. The second splitter 225b is coupled to a third output stage processor 215c and a fourth output stage processor 215d via a second routing switch 210b. The first and second output stage processors 215a, 215b are coupled to a first selector 230a, which is coupled to a first output terminal 235a. The third and fourth output stage processors 215c, 215d are coupled to a second selector 230b, which is coupled to a second output terminal 235b.

The functionalities of the various embodiments illustrated in FIGS. 2A-2D are discussed in detail below.

In the illustrated embodiments of FIGS. 2A-2D, the first stage consists of input terminals 220 that are configured to receive incoming RF signals 250. The incoming RF signals 250 may be received from an antenna, from another router, or from any other source. The incoming RF signals 250 are then forwarded to the next stage of the RF signal routing system.

In the various embodiments illustrated herein, the second stage may include splitters 225, such as in the case of FIGS. 2A and 2C, or input stage processors 205, such as in the case of FIGS. 2B and 2D. The subsequent stage, or the third stage, may include input stage processor 205, such as in the case of FIGS. 2A and 2C, or splitters 225, such as in the case of FIGS. 2B and 2D.

In some cases, the input stage processors 205 are configured to receive incoming RF signals 250, such as in the case of FIG. 2B and FIG. 2D. In some other cases, the input stage processors 205 are configured to receive input RF signals 255 from splitters 225, such as in the case of FIGS. 2A and 2C.

In various embodiments, the input stage processor 205 includes an automatic gain control module configured to process the received signals to adjust the power levels of the signals. The power levels of the received signals may be adjusted to a target power level provided by a controller, such as the controller 120 of FIG. 1. In some other cases, the power levels of the received signals may be adjusted to a pre-determined power level programmed into the input stage processor 205.

Splitters 225 are configured to receive an input signal and deliver multiple output signals corresponding to the input signal. The phase, amplitude and other characteristics of the multiple output signals are configured to be the same as the input signal in the various embodiments illustrated herein. In the embodiments of FIGS. 2A and 2C, the splitters 225 receive the incoming RF signals 250, and split the incoming RF signals 250 into two output signals 255, each with the same characteristics as the incoming RF signal 250. In the embodiments of FIGS. 2B and 2D, the splitters 225 receive processed signals 260 from the input stage processors 205, and split the processed signals 260 into output signals 255, each output signal having the same characteristics as the processed signal 260 received by the splitter 225.

In the various embodiments illustrated in FIGS. 2A-2D, the fourth stage consists of routing switches 210. The routing switches 210 are configured to route the signals received from splitters 225 or input stage processors 205 to selectors 230 or output stage processors 215. For example, as illustrated in the embodiment of FIG. 2A, the routing switch 210 is configured to route signals 260 from input stage processors 205 to selectors 230. In FIG. 2B, the routing switch 210 is configured to route signals 255 from splitters 225 to selectors 230. In FIG. 2C, the routing switch 210 is configured to route signals 260 from input stage processors 205 to output stage processors 215. In FIG. 2D, the routing switch 210 is configured to route signals 255 from splitters 225 to output stage processors 215.

In various embodiments, the number of routing switches 210 in the RF signal routing systems of FIGS. 2A-2D corresponds to the number of input terminals in those RF signal routing systems. The routing switches 210 in the RF signal routing systems of FIGS. 2A-2D are configured to provide a non-blocking RF router that can be used as both Fan-in and Fan-out routers. A full fan-in router is a router that facilitates routing of any one or more inputs to any one output. A full fan-out router is a router that facilitates routing of any one input to any one or more outputs. In various embodiments, the RF signal routing systems of FIGS. 2A-2D can be switched form a fan-in router to a fan-out router, or vice versa based on control signals from a controller, such as the controller 120 of FIG. 1.

In some cases, the RF signal routing systems of FIGS. 2A-2D are configured to provide a 100% non-blocking router that completely eliminates the possibility of blockage within the routing system. In some other cases, the RF signal routing systems of FIGS. 2A-2D are configured to provide a non-blocking router that significantly reduces the possibility of blockage within the routing system.

In the various embodiments illustrated herein, the fifth stage may include selectors 230, such as in the case of FIGS. 2A and 2B, or output stage processors 215, such as in the case of FIGS. 2C and 2D; and the subsequent sixth stage may include output stage processors 215, such as in the case of FIGS. 2A and 2B, or selectors 230, such as in the case of FIGS. 2C and 2D.

In some cases, the output stage processors 215 are configured to receive routed RF signals 265, such as in the case of FIG. 2C and FIG. 2D. In some other cases, the output stage processors 215 are configured to receive selected RF signals 270 from selectors 230, such as in the case of FIGS. 2A and 2B.

Each output stage processor 215 is configured to process the receive RF signal to adjust its power level based on a target power level provided by a controller, such as the controller 120 of FIG. 1.

In some embodiments, the target power level generated by the controller is based on the power level adjustment carried out by the corresponding input stage processor 205. In such embodiments, each output stage processor 215 includes an inverse AGC module configured to process the received signal to adjust the power level of the signal in order to compensate for the power adjustment carried out by the corresponding input stage processor 205.

In some other embodiments, the target power level generated by the controller is based on both the power level adjustment carried out by the corresponding input stage processor 205 as well as any additional increase or decrease in the power level of the received RF signal as may be determined by the controller.

Selectors 230 are configured to receive multiple input signals and deliver an output signal selected from the multiple input signals. The phase, amplitude and other characteristics of the output signal is the same as the input signal selected by the selectors 230.

In the embodiments of FIGS. 2A and 2B, the selectors 230 receive the routed RF signals 265, and select an output signal 270 from the routed RF signals 265. In the embodiments of FIGS. 2C and 2D, the selectors 230 receive processed RF signals 275 from the output stage processors 215, and select an output signal 270 from the processed RF signals 275.

In the various embodiments illustrated herein, the seventh stage consists of output terminals 235. Output terminals 235 are configured to receive an outgoing signal, such as signal 275 from output stage processors 215 in FIGS. 2A and 2B, and signal 270 from selectors 230 in FIGS. 2C and 2D. The signals received at the output terminals 235 are available for transmission to another router, an antenna or any other destination.

In some cases, the second and third stages can be referred to as an input stage; the fourth stage can be referred to as an intermediate stage; and the fifth and sixth stages can be referred to as an output stage.

Figure 3A:
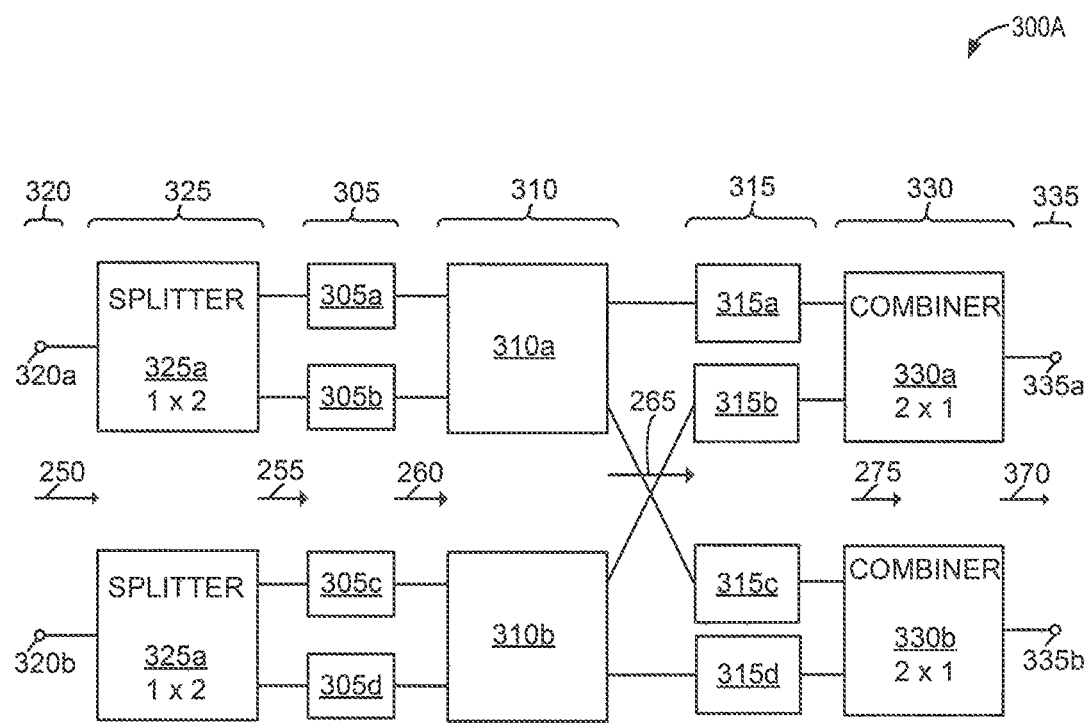
FIG. 3A is an example of a block diagram of a RF routing system using combiners.
Figure 3B:
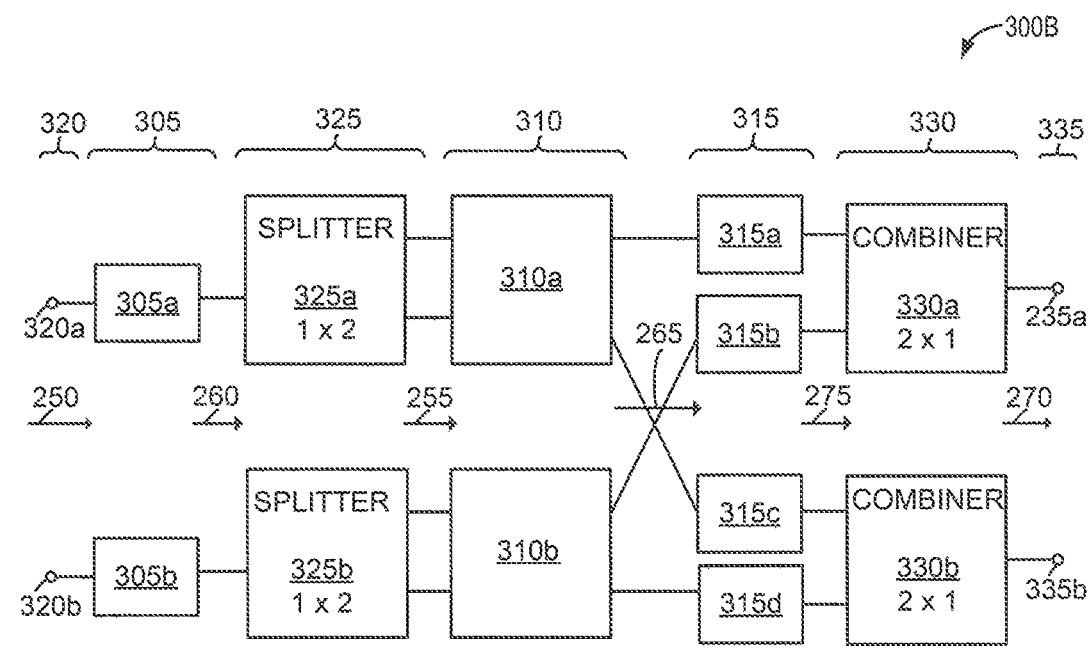
FIG. 3B is another example of a block diagram of a RF routing system using combiners.

Reference is next made to FIGS. 3A-3B, each of which illustrate a unique configuration of an RF signal routing system, such as the RF signal routing system 100. The embodiments illustrated in FIGS. 3A and 3B include the same components, such as splitters 325, input stage processors 305, routing modules 310, combiners 330 and output stage processors 315, but are unique based on the unique configuration and coupling of the various components, as discussed in detail below.

FIG. 3A illustrates an RF signal routing system 300A according to one example. As illustrated in FIG. 3A, RF signal routing system 300A comprises input terminals 320, splitters 325, input stage processors 305, routing switches 310, output stage processors 315, combiners 330 and output terminals 335 coupled in that order.

In particular, in the example embodiment of FIG. 3A, a first input terminal 320a is coupled to a first splitter 325a, and a second input terminal 320b is coupled to a second splitter 325b. The first splitter 325a is coupled to a first input stage processor 305a and a second input stage processor 305b. The second splitter 325b is coupled to a third input stage processor 305c and a fourth input stage processor 305d. The first and second input stage processors 305a, 305b are coupled to first and second output stage processors 315a, 315b, respectively, via a first routing switch 310a. The third and fourth input stage processors 305c, 305d are coupled to third and fourth output stage processors 315c, 315d, respectively, via a second routing switch 310b. The first and second output stage processors 315a, 315b are coupled to a first combiner 330a, which is coupled to a first output terminal 335a. The third and fourth output stage processors 315c, 315d are coupled to a second combiner 330b, which is coupled to a second output terminal 335b.

FIG. 3B illustrates an RF signal routing system 300B according to another example. As illustrated in FIG. 3B, RF signal routing system 300B comprises input terminals 320, input stage processors 305, splitters 325, routing switches 310, output stage processors 315, combiners 330 and output terminals 335 coupled in that order.

In particular, in the example embodiment of FIG. 3B, a first input terminal 320a is coupled to a first input stage processor 305a, and a second input terminal 320b is coupled to a second input stage processor 305b. The first input stage processor 305a is coupled to a first splitter 325a, and the second input stage processor 305b is coupled to a second splitter 325b. The first splitter 325a is coupled to a first output stage processor 315a and a second output stage processor 315b via a first routing switch 310a. The second splitter 325b is coupled to a third output stage processor 315c and a fourth output stage processor 315d via a second routing switch 310b. The first and second output stage processors 315a, 315b are coupled to a first combiner 330a, which is coupled to a first output terminal 335a. The third and fourth output stage processors 315c, 315d are coupled to a second combiner 330b, which is coupled to a second output terminal 335b.

The embodiments of FIGS. 3A and 3B are analogous to embodiments illustrated in FIGS. 2C and 2D, but differ in that the sixth stage of the RF signal routing systems 300A and 300B include combiners 330 instead of selectors 230. For simplicity and clarity of illustration, reference numbers used to illustrate the signal paths in FIGS. 2C and 2D are repeated in FIGS. 3A and 3B to indicate corresponding or analogous signal paths.

In the illustrated embodiments of FIGS. 3A and 3B, the processed signals 275, processed by the second stage processors 315, are provided to combiners 330. Each combiner 330 is configured to receive multiple processed signals 275 and combine them to deliver an output signal 370. The combined signal 370 is then provided to an output terminal 335 for transmission to other routers, antennas, or other devices.

In various embodiments, the combiners 330 are configured to combine the power levels of the input signals. In such cases, the signals being combined are processed by the output stage processors 315 before reaching the combiner 330. By processing the signals before combining, the second stage processors 315 can compensate for the processing by the corresponding first stage processors 305 on a signal-by-signal basis. Once the signals are combined, the corresponding constituent signals lose their independent characteristics, making the second stage processing of the signals to compensate for the first stage processing difficult and impractical. By processing the signals before they are combined at combiners 330, the RF routing systems of FIGS. 3A and 3B allow for the compensation of the first stage processing.

Figure 4A:
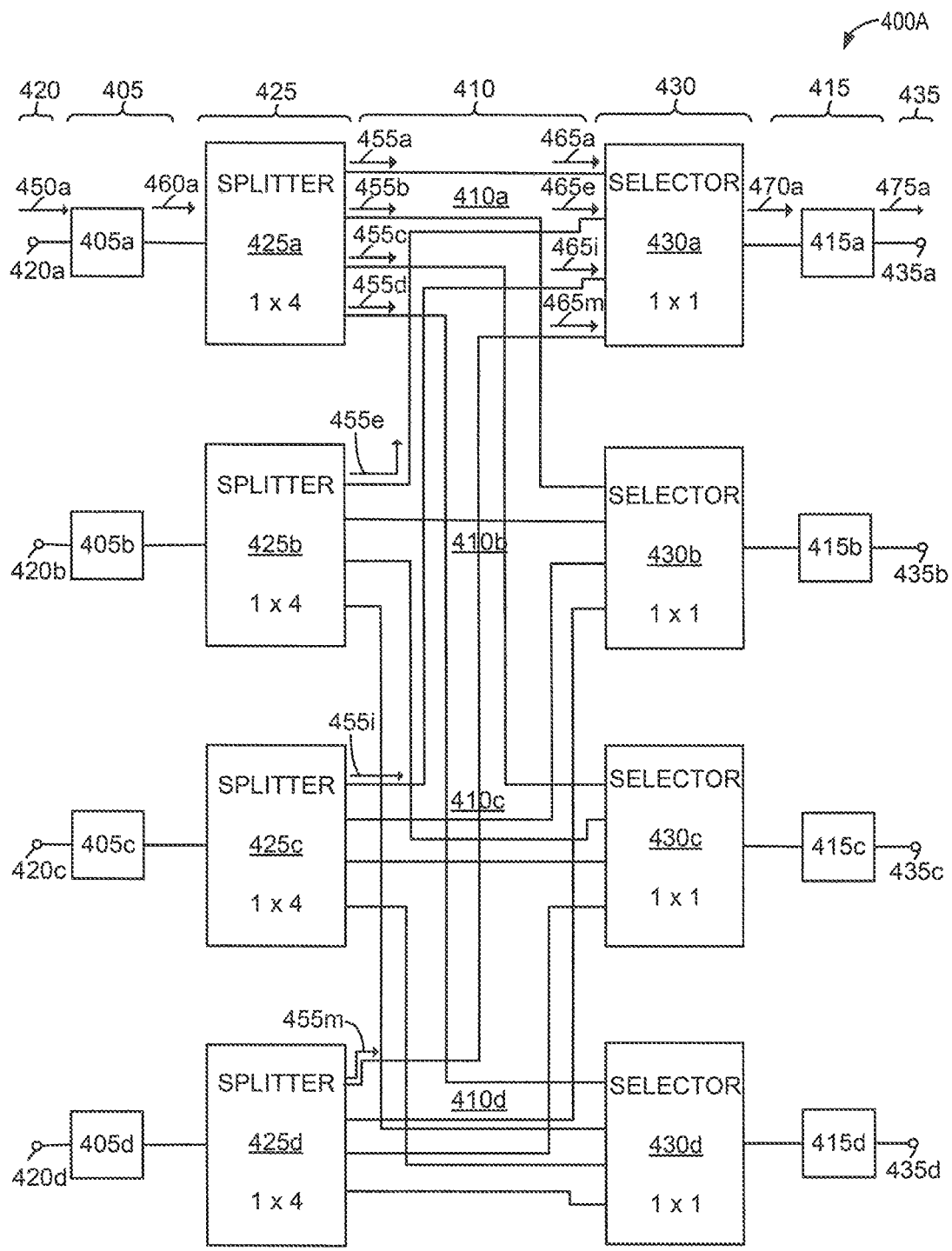
FIG. 4A is an example of a block diagram of a RF routing system with a larger dimension.

Reference is next made to FIG. 4A, which illustrates a RF signal routing system 400A according to an example embodiment. RF signal routing system 400A consists of input terminals 420, input stage processors 405, splitters 425, routing switches 410, selectors 430, output stage processors 415 and output terminals 435 coupled in that order.

In particular, in the example embodiment of FIG. 4A, a first input terminal 420a is coupled to a first input stage processor 405a, a second input terminal 420b is coupled to a second input stage processor 405b, a third input terminal 420c is coupled to a third input stage processor 405c, and a fourth input terminal 420d is coupled to a fourth input stage processor 405d. The first input stage processor 405a is coupled to a first splitter 425a, the second input stage processor 405b is coupled to a second splitter 425b, the third input stage processor 405c is coupled to a third splitter 425c, and the fourth input stage processor 405d is coupled to a fourth splitter 425d.

The first splitter 425a is coupled to a first selector 430a via a first routing switch 410a, the second splitter 425b is coupled to a second selector 430b via a second routing switch 410b, the third splitter 425c is coupled to a third selector 430c via a third routing switch 410c, and the fourth splitter 425d is coupled to a fourth selector 430d via a fourth routing switch 410d. The first selector 430a is coupled to a first output stage processor 415a, the second selector 430b is coupled to a second output stage processor 415b, the third selector 430c is coupled to a third output stage processor 415c, and the fourth selector 430d is coupled to a fourth output stage processor 415d. The first output stage processor 415a is coupled to a first output terminal 435a, the second output stage processor 415b is coupled to a second output terminal 435b, the third output stage processor 415c is coupled to a third output terminal 435c, and the fourth output stage processor 415d is coupled to a fourth output terminal 435d.

Figure 4B:
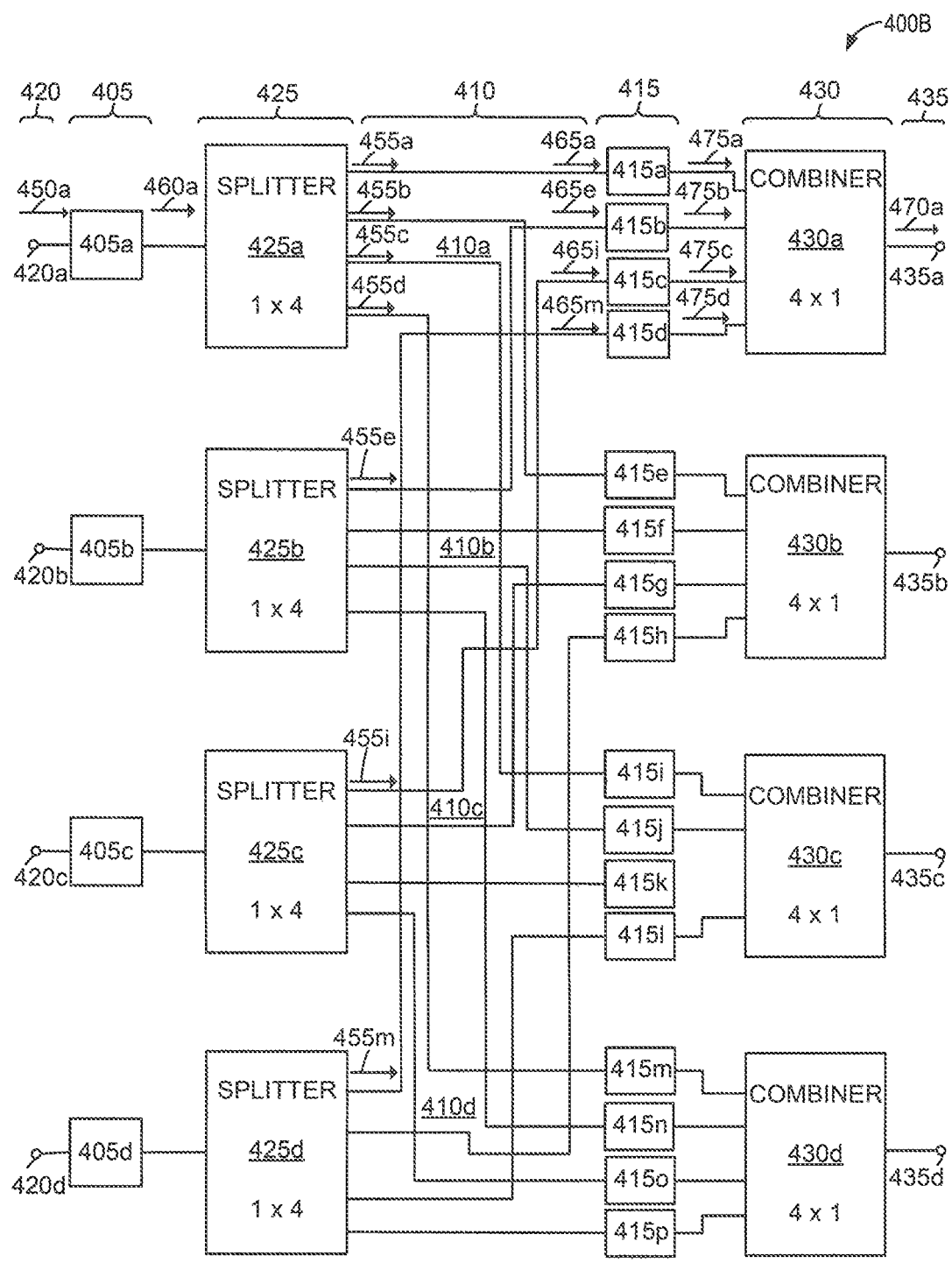
FIG. 4B is another example of a block diagram of a RF routing system with a larger dimension.

Reference is next made to FIG. 4B, which illustrates a RF signal routing system 400B according to an example embodiment. RF signal routing system 400B consists of input terminals 420, input stage processors 405, splitters 425, routing switches 410, output stage processors 415, combiners 430 and output terminals 435 coupled in that order.

In particular, in the example embodiment of FIG. 4B, a first input terminal 420a is coupled to a first input stage processor 405a, a second input terminal 420b is coupled to a second input stage processor 405b, a third input terminal 420c is coupled to a third input stage processor 405c, and a fourth input terminal 420d is coupled to a fourth input stage processor 405d. The first input stage processor 405a is coupled to a first splitter 425a, the second input stage processor 405b is coupled to a second splitter 425b, the third input stage processor 405c is coupled to a third splitter 425c, and the fourth input stage processor 405d is coupled to a fourth splitter 425d.

The first splitter 425a is coupled to a first output stage processor 415a, a second output stage processor 415b, a third output stage processor 415c and a fourth output stage processor 415d via a first routing switch 410. The second splitter 425b is coupled to a fifth output stage processor 415e, a sixth output stage processor 415f, a seventh output stage processor 415g and an eighth output stage processor 415h via a second routing switch 410b. The third splitter 425c is coupled to a ninth output stage processors 415i, a tenth output stage processor 415j, an eleventh output stage processor 415k a twelfth output stage processor 415l via a third routing switch 410c. The fourth splitter 425d is coupled to a thirteenth output stage processors 415m, a fourteenth output stage processor 415n, a fifteenth output stage processor 415o and a sixteenth output stage processor 415p via a fourth routing switch 410d.

The first to fourth output stage processors 415a, 415b, 415c, 415d are coupled to a first combiner 430a, the fifth to eighth output stage processors 415e, 415f, 415g, 415h are coupled to a second combiner 430b, the ninth to twelfth output stage processors 415i, 415j, 415k, 415l are coupled to a third combiner 430c, and the thirteenth to sixteenth output stage processors 415m, 415n, 415o, 415p are coupled to a fourth combiner 430d. The first combiner 430a is coupled to a first output terminal 435a, the second combiner 430b is coupled to a second output terminal 435b, the third combiner 430c is coupled to a third output terminal 435c, and the fourth combiner 430d is coupled to a fourth output terminal 435d.

The embodiments of FIGS. 4A and 4B are analogous to embodiments illustrated in FIGS. 2B and 2D, respectively, with the embodiments of FIGS. 4A and 4B illustrating larger size RF signal routing systems 400A, 400B, compared to RF signal routing systems 200B, 200D.

Even though the various embodiments illustrated herein disclose RF signal routing systems of small sizes or dimensions, such as 2×2 or 4×4, larger RF signal routing systems of larger sizes, such as 16×16, 256×256 etc., can be designed using the teachings herein. Furthermore, even though various embodiments illustrated herein disclose symmetrical RF signal routing systems, asymmetrical RF routing systems with an uneven number of input terminals and output terminals can also be designed using the teachings herein.

Reference is again made to FIGS. 4A and 4B to illustrate signal flow through the RF signal routing systems 400A and 400B. For simplicity and clarity of illustration, reference numbers used in FIG. 4A are repeated in FIG. 4B to indicate corresponding or analogous elements.

As illustrated, a first incoming signal 450a is received at the input terminal 420a, and forwarded to an input stage processor 405a. Input stage processor 405a is configured to adjust the power level of the first incoming signal 450a. The power level of the first incoming signal 450a may be adjusted to a system power level provided by a controller, such as the controller 120 of FIG. 1. The adjusted signal 460a is forwarded to a splitter 425a. Splitter 425a is configured to split the adjusted signal 460a into four output signals, i.e. a first split signal 455a, a second split signal 455b, a third split signal 455c and a fourth split signal 455d. The four split signals 455a-455d share the same characteristics as the adjusted signal 460a. Each of the four split signals 455a-455d are forwarded to a different one of the routing switches 410a-410d. In the illustrated embodiment, the first split signal 455a is routed to a first selector 430a via the first routing switch 410a, the second split signal 455b is routed to a second selector 430b via the second routing switch 410b, the third split signal 455c is routed to a third selector 430c via the third routing switch 410c, and the fourth split signal 455d is routed to a fourth selector 430d via the fourth routing switch 410d.

The remaining signal flow of FIG. 4A is explained with respect to the first selector 430a for ease of explanation. As illustrated, the first selector 430a is configured to receive routed signals from the routing switches 410. In the illustrated example, the first selector 430a is configured to receive a first routed signal 465a, a second routed signal 465e, a third routed signal 465i and a fourth routed signal 465m.

The first selector 430a is then configured to select one of the four routed signals 465a, 465e, 465i and 465m, and provide a selected signal 470a to the next stage. The first selector 430a is configured to select a signal based on the instructions form a controller, such as the controller 120 of FIG. 1. The selected signal 470a is then forwarded to the first output stage processor 415a. The first output stage processor 415a is configured to process the selected signal 470a based on a target power level signal provided by a controller, such as controller 120 of FIG. 1.

In some embodiments, the target power level signal provided by the controller is configured to compensate for the processing carried out by the first input stage processor 405a. For example, if the first input stage processor 405a is configured to amplify or attenuate the power level of the first incoming signal 450a by a target level, the second output processor 415a is configured to compensate for the attenuation of the power level of the first incoming signal 450a performed by the first input stage processor 405a. In this case, the selected signal 470a corresponds to the first routed signal 465a.

Likewise, in cases where the first selector 430a selects a second routed signal 465e, the first output stage processor 415a is configured to compensate for the power level adjustment carried out by the corresponding second input stage processor 405b. Similarly, if the first selector 430a selects a third routed signal 465i, the first output stage processor 415a is configured to compensate for the power level adjustment carried out by the corresponding third input stage processor 405c, and if the first selector 430a selects a fourth routed signal 465m, the first output stage processor 415a is configured to compensate for the power level adjustment carried out by the corresponding fourth input stage processor 405d.

The power level adjustment at the input stage processor 405 is targeted to amplify or attenuate the received signal to avoid signal distortion, such as clipping etc., as the signal traverses through the RF signal routing system 400A. The corresponding output stage processor 415 is configured to compensate for the signal processing carried out at the input stage processing stage as the signal exits the router.

In some other embodiments, the target power level signal provided by the controller is configured to not only compensate for the processing carried out by the first input stage processor 405a but also additionally increase or decrease the power level of the selected signal 470a.

Reference is now made to FIG. 4B, which illustrates another example of signal flow. In the embodiment of FIG. 4B, each of the routed signals, including a first routed signal 465a, a second routed signal 465e, a third routed signal 465i and a fourth routed signal 465m are received by a first output stage processor 415a, a second output stage processor 415b, a third output stage processor 415c and a fourth output stage processor 415d, respectively. The output stage processors 415 are configured to process the corresponding received routed signals based on a target power level provided by a controller, such as controller 120 of FIG. 1.

As discussed above, in some embodiments, the target power levels provided by the controller 120 to the corresponding output stage processors 415 are determined based on the processing carried out by the corresponding input stage processors 405. Accordingly, in such embodiments, the first output stage processor 415a is configured to compensate for the signal processing carried out by the first input stage processor 405a. Likewise, the second output stage processor 415b is configured to compensate for the signal processing carried out by the second input stage processor 405b, the third output stage processor 415c is configured to compensate for the signal processing carried out by the third input stage processor 405c, and the fourth output stage processor 415d is configured to compensate for the signal processing carried out by the fourth input stage processor 405d.

In some other embodiments, the target power levels provided by the controller 120 to the corresponding output stage processors 415 are configured to not only compensate for the processing carried out by the input stage processor 405 but also additionally increase or decrease the power levels of the corresponding routed signals. In such embodiments, the routed signals received by the output stage processors 415 are processed to not only compensate for the processing carried out by the corresponding input stage processors 405 but to additionally increase or decrease their respective power levels, based on target power levels provided by a controller, such as the controller 120 of FIG. 1. For example, the first routed signal 465a is processed by the first output stage processor 415a to compensate for the processing carried out by the first input stage processor 405a and additionally increase or decrease its respective power level based on a target power level provided by a controller.

Likewise, the second routed signal 465e is processed by the second output stage processor 415b to compensate for the processing carried out by the second input stage processor 405b and additionally increase or decrease its respective power level based on a target power level provided by a controller, the third routed signal 465i is processed by the third output stage processor 415c to compensate for the processing carried out by the third input stage processor 405c and additionally increase or decrease its respective power level based on a target power level provided by a controller, and the fourth routed signal 465m is processed by the fourth output stage processor 415d to compensate for the processing carried out by the fourth input stage processor 405b and additionally increase or decrease its respective power level based on a target power level provided by a controller.

The first output stage processor 415a is configured to provide a first processed signal 475a, the second output stage processor 415b is configured to provide a second processed signal 475b, the third output stage processor 415c is configured to provide a third processed signal 475c and the fourth output stage processor 415d is configured to provide a fourth processed signal 475d. The processed signals 475a-475d are received by a first combiner 430a, which is configured to combine the received signals and generate an output signal 470a. As mentioned above, the embodiments including a combiner, such as combiner 430 of FIG. 4B, require the output stage processors 415, and corresponding signal processing to compensate for the first stage processing, at an earlier stage than the combiners 430. The output signal 470a is then forwarded to the first output terminal 435a.

As mentioned above, in the various embodiments illustrated herein, the second stage processors, such as processors 215 of FIGS. 2A-2D, processors 315 of FIGS. 3A-3B, and processors 415 of FIGS. 4a-4B, are configured to process the incoming signals in order to compensate for the processing carried out by the input stage processors, such as processors 205 of FIGS. 2A-2D, processors 305 of FIGS. 3A-3B, and processors 405 of FIGS. 4A-4B. The second stage processors can be further configured by a controller, such as controller 120 of FIG. 1, to additionally manipulate the compensated signals by amplifying, attenuating, or otherwise processing the signals, as may be desired by the controller 120 and required by the application of the RF signal routing system. For example, the second stage processor may be configured to not only compensate for the first stage processing carried out by the corresponding first stage processor, but additionally add 10 dB of power to the processed signal.

Reference is next made to FIG. 5A, which illustrates an RF signal routing system 500A according to an example embodiment. In the illustrated embodiment, the RF signal routing system 500A is a universal RF fan-in and/or fan-out router. FIG. 5A illustrates a signal path for one input signal received at an input terminal 520. The entire RF signal routing system will include a plurality of input terminals 520 to receive a plurality of input signals. The input signals may be processed through various stages and maybe switched in a plurality of routing switches and then output at a plurality of output terminals 535.

In the embodiment of FIG. 5A, the same architecture of RF signal routing system 500A can be used to implement a fan-in router, a fan-out router or both. Fan-in routers are typically (but not always) used to route signals with relatively high power levels, such as, for example, signals with power levels within the range of −10 to +15 dBm. Likewise, fan-out routers are typically (but not always) used to route signals with relatively low power levels, such as, for example, signals with power levels within the range of −70 to −10 dBm. For a universal router that can work as both fan-in and fan-out routers, such as the RF signal routing system 500A, the input signal power range of the router is preferably extended without substantially compromising other RF performance characteristics of the RF signal routing system 500A, such as noise figure, inter-modulation, 1 dB compression point etc.

As illustrated in FIG. 5A, the RF signal routing system 500A comprises a plurality of input terminals 520, attenuators 580, amplifiers 585, input stage processors 505, splitters 525, routing switches 510, output stage processors 515, multi-input processors 530 and output terminals 535 coupled in that order. Only one signal path through RF signal routing system 500A is illustrated, although an RF signal routing system according to this embodiment will typically include a plurality of signal paths, as is illustrated above in relation to RF signal routing systems 200A, 300A and 400A. The system 500A is provided as an example and there can be other embodiments of the system 500A with different components or a different configuration of the components described herein.

The attenuators 580 of the RF signal routing system 500A are coupled to the input terminals 520 on one end and input stage processors 505 on the other end via a set of attenuator switches 582. When closed, attenuator switches 582 incorporate the attenuators 580 in the signal path of an incoming RF signal within the router 500A. When open, the attenuators 580 are excluded from the signal path of an incoming RF signal within the router 500A. The attenuator switches 582 used with the attenuators 580 are low insertion loss RF switches.

Likewise, the amplifiers 585 of the RF signal routing system 500A are coupled to the input terminals 520 on one end and input stage processors 505 on the other end via a set of amplifier switches 586. When closed, amplifier switches 586 incorporate the amplifiers 585 in the signal path of an incoming RF signal within the router 500A. When open, the amplifiers 585 are excluded from the signal path of an incoming RF signal within the router 500A. The amplifier switches 586 used with the amplifiers 585 are also low insertion loss RF switches.

As illustrated, a set of processor switches 592 are coupled between the input terminals 520 and the input stage processors 505. When processor switches 592 are closed, the attenuators 580 and amplifiers 585 are excluded from the signal path of an incoming RF signal within the router 500A.

At one time, only one of switches 582, 586 and 592 will be closed. In other embodiments, the three switches may be replaced with a selector switch or other switching arrangements.

The various components of the RF signal routing system 500A, including the input terminals 520, attenuators 580, attenuator switches 582, amplifiers 585, amplifier switches 586, input stage processors 505, splitters 525, routing switches 510, output stage processors 515, multi-input processors 530 and output terminals 535, are coupled to a controller 540. The controller 540 monitors the RF signals traversing through the RF signal routing system 500A and controls the operation of the various components of the RF signal routing system 500A.

In the illustrated embodiment, the controller 540 monitors the power levels of the incoming RF signals 550 and switches the attenuators 580 and amplifiers 585 in and out of the signal path as required for input signals having different power levels.

The controller 540 also controls the attenuation levels of the attenuators 580, and amplifications levels of the amplifiers 585 based on factors such as power levels of the incoming RF signals 550, desired power levels of outgoing RF signals 570 etc.

In the illustrated embodiment of FIG. 5A, when the power level of the incoming RF signal drops below a predefined value, the controller 540 triggers the attenuator switches 582 and processor switches 592 to open, and the amplifier switches 586 to close. Accordingly, the incoming RF signals received at the input terminals 520 are next routed to the amplifiers 585. In the various embodiments illustrated herein, amplifiers 585 are low noise amplifiers.

In some embodiments, the attenuators 580 are switched out of the signal path of an incoming RF signal when the power level of the incoming RF signal is within the range of −70 to −15 dBm.

Furthermore, when the power level of the incoming RF signal is relatively high, for example in the range of +5 to +15 dBm, the controller 540 triggers the amplifier switches 586 and the processor switches 592 to open, and the attenuator switches 582 to close. Accordingly, the incoming RF signals received at the input terminals 520 are next routed to the attenuators 580.

In cases where the power level of the incoming RF signal is relatively mid-range, for example in the range of −15 to +5 dBm, the controller 540 triggers the attenuator switches 582 and the amplifier switches 586 to open, and the processor switches 592 to close. Accordingly, the incoming RF signals received at the input terminals 520 are next routed to the input stage processors 505.

The power levels in which attenuators 580 and amplifiers 585 are switched into the signal path of an input signal are only examples and in any particular embodiment of an RF signal routing system, input signals in different power ranges may be amplified, attenuated or routed through to the next stage.

Reference is next made to FIG. 5B, which illustrates an RF signal routing system 500B according to an example embodiment. The architecture of RF signal routing system 500B is similar to the architecture of RF signal routing system 500A, with the exception of the couplings involving attenuators 580 and amplifiers 585.

In the illustrated embodiment of FIG. 5B, the attenuators 580 are coupled between the input terminals 520 on one end and amplifiers 585 on the other end via attenuator switches 582. The processor switches 592 are situated in parallel with the attenuator switches 582, and the amplifiers 585 are situated in series to the parallel combination of attenuators 580 and processor switches 592.

In the illustrated embodiment of FIG. 5B, when the power level of the incoming RF signal drops below a predefined value, the controller 540 triggers the attenuator switches 582 to open, and the processor switches 592 to close. Accordingly, the incoming RF signals received at the input terminals 520 are routed to the amplifiers 585 without first passing through attenuators 580. In the various embodiments illustrated herein, amplifiers 585 are low noise amplifiers.

Furthermore, when the power level of the incoming RF signal is above the predefined value and thus is relatively high, for example in the range of +5 to +15 dBm, the controller 540 triggers the processor switches 592 to open, and the attenuator switches 582 to close. Accordingly, the incoming RF signals received at the input terminals 520 are next routed to the attenuators 580 via the attenuator switches 582. The attenuated RF signals are next routed to the amplifiers 585, and subsequently to input stage processors 505, and so on as illustrated in system 500B.

In the embodiment illustrated in FIG. 5B, the attenuators 580 and attenuator switches 582 can result in an insertion loss. In some cases, the insertion loss may be a 2 dB insertion loss. The subsequent stage of amplification provided by amplifiers 585 compensates for the insertion loss by amplifying the signal by a corresponding value. In addition, amplifiers 585 may be configured by controller 540 to provide additional amplification to allow the input signal to be efficiently processed within the RF signal routing system or to provide an output signal with a desired power level, or both.

Figure 6:
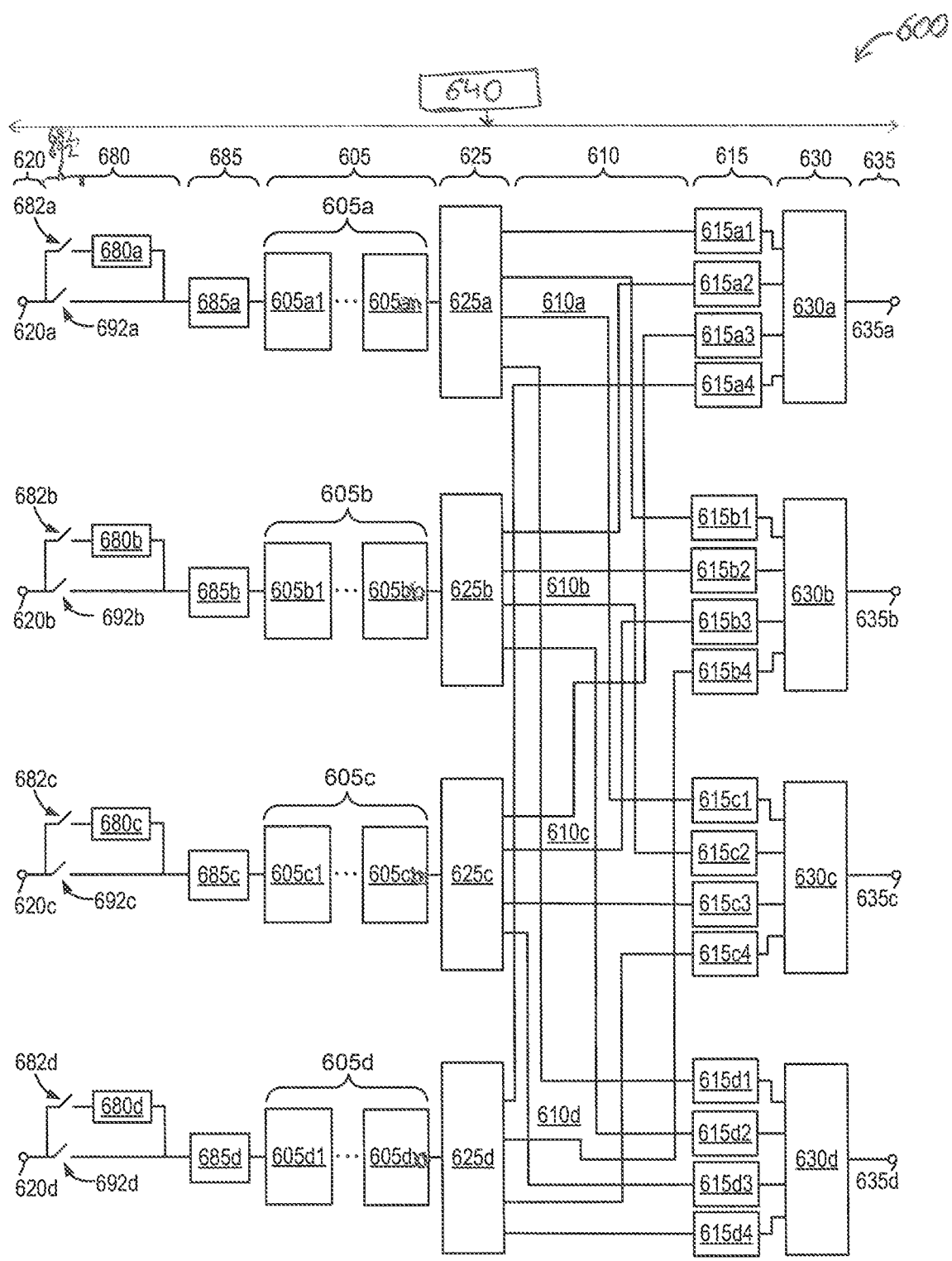
FIG. 6 is a further example of a block diagram of a RF routing system with a pre-processing circuit.

Reference is next made to FIG. 6, which illustrates an RF signal routing system 600 according to an example embodiment. The embodiment of FIG. 6 is analogous to embodiment illustrated in FIG. 4B, with the exception of a pre-processing circuit disclosed in FIG. 6.

In particular, the RF signal routing system 600 consists of a pre-processing circuit including a series combination of attenuator switches 682 and attenuators 680, processor switches 692 in parallel with the series combination of attenuators 680 and attenuator switches 682, and amplifiers 685 in series with the parallel combination of processor switches 692 with series combination of attenuators 680 and attenuator switches 682. RF signal routing system 600 further comprises input terminals 620 before the pre-processing circuit, where the input terminals 620 are analogous to input terminals 420 of FIG. 4B.

RF signal routing system 600 further comprises one or more input signal processors 605 analogous to input signal processors 405 of FIG. 4B, splitters 625 analogous to splitters 425 of FIG. 4B, routing switches 610 analogous to routing switches 410 of FIG. 4B and output stage processors 615 analogous to output stage processors 415 of FIG. 4B.

In addition, the RF signal routing system 600 further comprises multi-input processors 630, which operates as both combiners, analogous to combiners 430 of FIG. 4B, and selectors, analogous to selectors 430 of FIG. 4A. The RF signal routing system 600 further comprises output terminals 635, analogous to output terminals 435 of FIG. 4B.

As illustrated, the RF signal routing system 600 comprises the input terminals 620, pre-processing circuit comprising the attenuators 680, amplifiers 685, attenuator switches 682 and processor switches 692, input stage processors 605, splitters 625, routing switches 610, output stage processors 615, multi-input processors 630 and output terminals 635 coupled in that order. The various elements of the RF signal routing system 600 are coupled to a controller 640.

As illustrated, in the first-level of the RF signal routing system 600 of FIG. 6, a first input terminal 620a is coupled to a parallel combination of a first processor switch 692a with a series combination of a first attenuator switch 682 and a first attenuator 680a. This parallel combination is coupled in series to a first amplifier 685a. The first amplifier 685a is coupled to one or more input stage processors 605.

As illustrated, the first amplifier 685a is coupled to one or more first-level input stage processors 605a, including a first first-level input stage processor 605a1 coupled to another input stage processor 605an. In some cases, there may be two or more first-level input stage processors.

Next, the first-level input stage processors are coupled to a first splitter 625a. The first splitter 625a is coupled to a first routing switch 610a. In the illustrated embodiment, each routing switch 610a is coupled to a plurality of output stage processors 615. For instance, the first routing switch 610a is coupled to a first first-level output stage processor 615a1, a first second-level output stage processor 615b1, a first third-level output stage processor 615c1 and a first fourth-level output stage processor 615d1.

In the illustrated embodiment, the next stage involves the output stage processors 615. As illustrated, in the first-level, the first first-level output stage processor 615a1 is coupled to the first routing switch 610a. Likewise, a second first-level output stage processor 615a2 is coupled to a second routing switch 610b, a third first-level output stage processor 615a3 is coupled to a third routing switch 610c and a fourth first-level output stage processor 615a4 is coupled to a fourth routing switch 610d.

The first, second, third and fourth first-level output stage processors 615a1, 615a2, 615a3 and 615a4 are coupled to a first multi-input processor 630a, which is coupled to a first output terminal 635a. In some cases, the first multi-input processor 630a is configured to operate as a selector, where the first multi-input processor 630a selects one of the input signals received from the first, second, third and fourth first-level output stage processors 615a1, 615a2, 615a3 and 615a4. The selected RF signal is then output at the corresponding first output terminal 635a.

In some other cases, the first multi-input processor 630a is configured to operate as a combiner, where the first multi-input processor 630a combines the input signals received from the first, second, third and fourth first-level output stage processors 615a1, 615a2, 615a3 and 615a4. The combined RF signal is then output at the corresponding first output terminal 635a.

As further illustrated in FIG. 6, the second-level includes a second input terminal 620b coupled in series to a parallel combination of a second processor switch 692b with a second attenuator 680b and a second attenuator switch 682b. This parallel combination is coupled in series to a second amplifier 685b, which is coupled to one or more second-level input stage processors 605b. The second-level input stage processors 605b are coupled to a second splitter 625b, which is coupled to a second routing switch 610b.

The second routing switch 610b is coupled to a plurality of output stage processors 615. In the illustrated embodiment, the second routing switch 610b is coupled to a second first-level output stage processor 615a2, a second second-level output stage processor 615b2, a second third-level output stage processor 615c2 and a second fourth-level output stage processor 615d2. The second-level output stage processors are coupled to a second multi-input processor 630b, which is coupled to a second output terminal 635b. As discussed above, the second multi-input processor 630b can be configured to be a selector or a combiner by the controller 640.

Next, the third-level includes a third input terminal 620c coupled in series to a parallel combination of a third processor switch 692c with a third attenuator 680c and a third attenuator switch 682c. This parallel combination is coupled in series to a third amplifier 685c, which is coupled to one or more third-level input stage processors 605c. The third-level input stage processors 605c are coupled to a third splitter 625c, which is coupled to a third routing switch 610c.

The third routing switch 610c is coupled to a plurality of output stage processors 615. In the illustrated embodiment, the third routing switch 610c is coupled to a third first-level output stage processor 615a3, a third second-level output stage processor 615b3, a third third-level output stage processor 615c3 and a third fourth-level output stage processor 615d3. The third-level output stage processors are coupled to a third multi-input processor 630c, which is coupled to a third output terminal 635c. As discussed above, the third multi-input processor 630c can be configured to be a selector or a combiner by the controller 640.

As further illustrated in FIG. 6, the fourth-level includes a fourth input terminal 620d coupled in series to a parallel combination of a fourth processor switch 692d with a fourth attenuator 680d and a fourth attenuator switch 682d. This parallel combination is coupled in series to a fourth amplifier 685d, which is coupled to one or more fourth-level input stage processors 605d. The fourth-level input stage processors 605d are coupled to a fourth splitter 625d, which is coupled to a fourth routing switch 610d.

The fourth routing switch 610d is coupled to a plurality of output stage processors 615. In the illustrated embodiment, the fourth routing switch 610d is coupled to a fourth first-level output stage processor 615a4, a fourth second-level output stage processor 615b4, a fourth third-level output stage processor 615c4 and a fourth fourth-level output stage processor 615d4. The fourth-level output stage processors are coupled to a fourth multi-input processor 630d, which is coupled to a fourth output terminal 635d. As discussed above, the fourth multi-input processor 630d can be configured to be a selector or a combiner by the controller 640.

In some cases, the RF signal routing system 600 includes the same number of input stage processors 605 at each level. In some other cases, different levels of the RF signal routing system 600 include different number of input stage processors 605.

In the embodiment of FIG. 6, controller 640 is configured to control the operation of the various elements of the RF signal routing system 600. In addition to controlling the signal positions of the attenuator switches 682 and the processor switches 692, controller 640 is also configured to control the gain levels of the attenuators 680, amplifier 685, input stage processors 605 and output stage processors 615. Controller 640 is further configured to control the operation of the splitters 625, multi-input processors 630 and routing switches 610.

In various embodiments disclosed herein, the controller 640 is configured to operate the pre-processing circuit of the RF signal routing system 600 based on the power levels of the incoming RF signal. For example, the controller 640 is configured to switch out the attenuators 580 from the signal path of an incoming RF signal when the power level of the incoming RF signal is within a low power signal range. The low power signal range can include a power level range of about −70 to +5 dBm. When the attenuators 580 are switched out of the signal path, the incoming RF signal is routed directly to the amplifiers 685, and subsequently to the one or more input stage processors 605.

Furthermore, the controller 640 is configured to switch in the attenuators 680 in the signal path of an incoming RF signal when the power level of the incoming RF signal is within a high power signal range. The high power signal range can include a power level range of about +5 to +15 dBm, In this embodiments, the incoming RF signal is routed to the attenuators 580 followed by the amplifiers 685. The incoming RF signal is next routed to the one or more input stage processors 605. The operation of the RF signal routing system 600 after the pre-processing circuit is analogous to the router operation discussed above with reference to FIG. 4B.

Although the pre-processing circuit of FIG. 6 is illustrated to be analogous to the pre-processing circuit of RF signal routing system 500B disclosed in FIG. 5B, in other embodiments, the pre-processing circuit illustrated in the RF signal routing system 500A of FIG. 5A can be used as the pre-processing circuit of FIG. 6 for some or all of the incoming RF signals.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A radio frequency (RF) router comprising:
a controller;
an input stage comprising:
    a plurality of RF input terminals, wherein each RF input terminal is configured to receive an incoming RF signal;
    a pre-processing circuit coupled to each RF input terminal and the controller, the pre-processing circuit configured to process the incoming RF signal to generate a pre-processed RF signal based on a first signal from the controller; and
    an input processor coupled to each pre-processing circuit and the controller, the input processor being configured to process the pre-processed RF signal by applying a power level adjustment to the corresponding pre-processed RF signal based on a second signal from the controller to generate a processed input RF signal;
an intermediate stage comprising a plurality of intermediate switch matrices coupled to the controller, each intermediate switch matrix being coupled to each input processor, the plurality of intermediate switch matrices being configured to route a plurality of intermediate RF signals; and
an output stage having:
    a plurality of output processors coupled to the controller, each output processor being configured to receive an output RF signal, the output RF signal being associated with at least one input processor, and to process the output RF signal to generate a processed output RF signal by adjusting, based on a third signal from the controller, a power level of the output RF signal to compensate for the power level adjustment applied at the associated at least one input processor.

2. The RF router of claim 1, wherein each pre-processing circuit comprises
an attenuator for attenuating a power level of the incoming RF signal; and
an amplifier for amplifying a power level of the incoming RF signal, the amplifier being parallel to the attenuator, wherein:
if the power level of the incoming RF signal is within a low power level range, the amplifier processes the incoming RF signal to generate the pre-processed RF signal based on the first signal from the controller, and
if the power level of the incoming RF signal is within a high power level range, the attenuator processes the incoming RF signal to generate the pre-processed RF signal based on the first signal from the controller.

3. The RF router of claim 1, wherein each pre-processing circuit comprises
an attenuator for attenuating a power level of the incoming RF signal; and
an amplifier for amplifying a power level of the incoming RF signal, the amplifier being in series with a circuit comprising the attenuator, wherein:
if the power level of the incoming RF signal is within a low power level range, the amplifier processes the incoming RF signal to generate the pre-processed RF signal based on the first signal from the controller, and
if the power level of the incoming RF signal is within a high power level range, the attenuator processes the incoming RF signal to generate a corresponding attenuated RF signal, and subsequently the amplifier processes the attenuated RF signal to generate the pre-processed RF signal.

4. The RF router of claim 1, wherein the input stage further comprises:
a plurality of splitters coupled to the plurality of input stage processors, each splitter being coupled between a corresponding input stage processor and at least two intermediate switch matrices, and configured to split the corresponding processed input RF signal into two or more intermediate RF signals.

5. The RF router of claim 1, wherein the input stage further comprises:
a plurality of splitters coupled to the plurality of input stage processors, each splitter being coupled between a corresponding pre-processing circuit and a corresponding input stage processor, and configured to split the corresponding incoming pre-processed input RF signal into two or more pre-processed RF signals.

6. The RF router of claim 1, wherein the output stage further comprises:
a plurality of combiners coupled between the plurality of output processors and a plurality of RF output terminals, each combiner being configured to combine two or more processed output RF signals to generate an outgoing RF signal.

7. The RF router of claim 1, wherein the output stage further comprises:
a plurality of selectors coupled between the plurality of output processors and a plurality of RF output terminals, each selector being configured to select a processed output RF signals to generate an outgoing RF signal.

8. The RF router of claim 1, wherein each input stage processor is configured to adjust the power level of the corresponding pre-processed RF signal by amplifying the pre-processed RF signal to a system power level.

9. The RF router of claim 8, wherein each output processor is configured to amplify the output RF signal to an output power level, wherein the amplification of the output RF signal compensates for the amplification of the pre-processed RF signal.

10. The RF router of claim 1, wherein the third signal is partially based on the second signal.

11. A radio frequency (RF) router comprising:
a controller;
an input stage comprising:
a plurality of RF input terminals, wherein each RF input terminal is configured to receive an incoming RF signal; and
a plurality of input processors coupled to the plurality of RF input terminals and the controller, each input processor being configured to process an input RF signal to generate a processed input RF signal, and each input processor being further configured to apply a power level adjustment to the corresponding input RF signal based on a first signal from the controller;
an intermediate stage comprising a plurality of intermediate switch matrices coupled to the controller, each intermediate switch matrix being coupled to the plurality of input processors, the plurality of intermediate switch matrices being configured to route a plurality of intermediate RF signals; and
an output stage comprising:
a plurality of output processors coupled to the controller, each output processor being configured to receive an output RF signal, the output RF signal being associated with at least one input processor, and to process the output RF signal to generate a processed output RF signal by adjusting, based on a second signal from the controller, a power level of the output RF signal to compensate for the power level adjustment applied at the associated at least one input processor.

12. The RF router of claim 11, wherein the input stage further comprises:
a plurality of splitters coupled the plurality of input processors, each splitter being coupled between a corresponding input processor and at least two intermediate switch matrices, and configured to split the corresponding processed input RF signal into two or more intermediate RF signals.

13. The RF router of claim 11, wherein the input stage further comprises:
a plurality of splitters, each splitter being coupled between a corresponding RF input terminal and at least two of the plurality of input processors, the splitter being configured to split the incoming RF signal received at the corresponding RF input terminal into two or more input RF signals.

14. The RF router of claim 11, wherein the output stage further comprises:
a plurality of combiners coupled between the plurality of output processors and a plurality of RF output terminals, each combiner being configured to combine two or more processed output RF signals to generate an outgoing RF signal.

15. The RF router of claim 11, wherein the output stage further comprises:
a plurality of selectors coupled between the plurality of output processors and a plurality of RF output terminals, each selector being configured to select a processed output RF signals to generate an outgoing RF signal.

16. The RF router of claim 11, wherein the output stage further comprises:
a plurality of selectors coupled between the plurality of intermediate switch matrices and the plurality of output processors, each selector being configured to select an intermediate RF signal to generate an output RF signal.

17. The RF router of claim 11, wherein the input processor is configured to adjust the power level of the corresponding input RF signal by amplifying the input RF signal to a system power level.

18. The RF router of claim 17, wherein if the input processor is configured to amplify the input RF signal to a system power level, the output processor is configured to amplify the output RF signal to an output power level, wherein the amplification of the output RF signal compensates for the amplification of the input RF signal.

19. The RF router of claim 11, wherein the power level adjustment of the output RF signal based on the second signal is inverse of the power level adjustment of the input RF signal based on the first signal.

20. The RF router of claim 11, wherein the second signal is partially based on the first signal.

21. A radio frequency (RF) router comprising:
a controller;
an input stage comprising:
a plurality of RF input terminals, wherein each RF input terminal is configured to receive an input RF signal;
a plurality of input processors coupled to the controller, each input processor being coupled to a unique RF input terminal, and each input processor being configured to process the input RF signal received at the corresponding RF input terminal to generate a processed input RF signal, wherein each input processor is configured to apply a power level adjustment to the corresponding input RF signal based on a first signal from the controller; and
a plurality of splitters coupled the plurality of input processors, each splitter being coupled to a unique input processor, and configured to split the corresponding processed input RF signal into two or more intermediate RF signals;
an intermediate stage comprising a plurality of intermediate switch matrices coupled to the controller, each intermediate switch matrix being coupled to the plurality of splitters, the plurality of intermediate switch matrices being configured to route a plurality of intermediate RF signals; and
an output stage comprising:
a plurality of output processors coupled to the controller, each output processor being configured to process an intermediate RF signal associated with at least one input processor and generate a processed output RF signal by adjusting a power level of the intermediate RF signal, based on a second signal from the controller, to compensate for the power level adjustment applied at the associated at least one input processor; and a plurality of combiners coupled to the plurality of output processors and configured to combine two or more processed output RF signals to generate an output RF signal.

22. The RF router of claim 21, wherein the input processor is configured to adjust the power level of the corresponding input RF signal by amplifying the input RF signal to a system power level.

23. The RF router of claim 22, wherein if the input processor is configured to amplify the input RF signal by a gain level, the output processor is configured to adjust the power level of the corresponding intermediate RF signal by attenuating the intermediate RF signal by an attenuation level corresponding to the gain level.

24. The RF router of claim 21, wherein if the input processor is configured to amplify the input RF signal to a system power level, the output processor is configured to amplify the output RF signal to an output power level, wherein the amplification of the output RF signal compensates for the amplification of the input RF signal.

25. The RF router of claim 21, wherein the power level adjustment of the output RF signal based on the second signal is inverse of the power level adjustment of the input RF signal based on the first signal.

26. A radio frequency (RF) router comprising:
a controller;
an input stage comprising:
  a plurality of RF input terminals, wherein each RF input terminal is configured to receive an input RF signal, and wherein the input stage further comprises:
  a plurality of splitters, each splitter being uniquely coupled to a RF input terminal, the splitter being configured to split the input RF signal received at the corresponding RF input terminal into two or more intermediate RF signals; and
  a plurality of input processors coupled to the controller, each input processor being configured to receive an intermediate RF signal and process the intermediate RF signal to generate a corresponding processed RF signal, wherein each input processor is configured to apply a power level adjustment of the corresponding input RF signal based on a first signal from the controller;
an intermediate stage comprising a plurality of intermedia switch matrices coupled to the controller, each switch matrix coupled to receive a plurality of processed RF signals from the plurality of input processors, and route the processed RF signals; and
an output stage comprising:
  a plurality of output processors coupled to the controller, each output processor being configured to receive a processed RF signal being associated with at least one input processor, and further process the processed RF signal to generate a corresponding processed output RF signal by adjusting a power level of the corresponding intermediate RF signal, based on a second signal from the controller, to compensate for the power level adjustment applied at the associated input processor; and
  a plurality of combiners coupled to the plurality of output processors and configured to combine two or more processed output RF signals to generate an output RF signal.

27. The RF router of claim 26, wherein the input processor is configured to adjust the power level of the corresponding input RF signal by amplifying the input RF signal to a system power level.

28. The RF router of claim 26, wherein if the input processor is configured to amplify the input RF signal to a system power level, the output processor is configured to amplify the output RF signal to an output power level, wherein the amplification of the output RF signal compensates for the amplification of the input RF signal.

29. The RF router of claim 26, wherein the power level adjustment of the output RF signal based on the second signal is inverse of the power level adjustment of the input RF signal based on the first signal.

30. The RF router of claim 29, wherein the output processor is partially based on the first signal.

* * * * *